United States Patent
Kinnunen et al.

(10) Patent No.: US 6,230,015 B1
(45) Date of Patent: May 8, 2001

(54) PICKING UP OF MOBILE STATIONS FROM A DIRECT MODE CHANNEL

(75) Inventors: Kimmo Kinnunen, Jyväskylä ; Osmo Schroderus, Sumiainen, both of (FI)

(73) Assignee: Nokia Telecommunications OY, Espoo (FI)

( * ) Notice: Subject to any disclaimer, the term of this patent is extended or adjusted under 35 U.S.C. 154(b) by 0 days.

(21) Appl. No.: 08/894,399

(22) PCT Filed: Feb. 16, 1996

(86) PCT No.: PCT/FI96/00089

§ 371 Date: Aug. 18, 1997

§ 102(e) Date: Aug. 18, 1997

(87) PCT Pub. No.: WO96/25808

PCT Pub. Date: Aug. 22, 1996

(30) Foreign Application Priority Data

Feb. 17, 1995 (FI) ...................................... 950745

(51) Int. Cl.[7] ...................................... H04Q 7/00
(52) U.S. Cl. ............................. 455/450; 455/509
(58) Field of Search ................... 455/422, 434, 455/450, 455, 11.1, 509, 517, 518, 67.1, 70, 62, FOR 100, FOR 113, FOR 114; 370/337, 347, 328, 329, 330, 348, 522, 501, 315

(56) References Cited

U.S. PATENT DOCUMENTS 5,771,463 * 6/1998 Lehmusto et al. .................... 455/509
5,907,794 * 5/1999 Lehmusto et al. .................... 455/509

FOREIGN PATENT DOCUMENTS

| 7067182 | 3/1995 | (JP) . |
| 93 16566 | 8/1993 | (WO) . |
| 95 06395 | 3/1995 | (WO) . |
| 95 24655 | 9/1995 | (WO) . |
| 96 26613 | 10/1995 | (WO) . |

OTHER PUBLICATIONS

Trans European Trunked Radio System Tetra Technical Requirements Specification, Part 4: Direct Mode, Tetra document 02.04, ETSI, Version: 0.8.8, Jan. 19, 1995, pp. 2–30.

Tetra—Direct Mode Working Assumptions, ETSI, Jan. 30, 1995, pp. 2–8.

* cited by examiner

Primary Examiner—Reinhard J. Eisenzopf
Assistant Examiner—Marsha D. Banks-Harold
(74) Attorney, Agent, or Firm—Pillsbury Winthrop LLP (57) ABSTRACT

A method of picking up mobile stations (DMRU1 to DMRU6) onto a direct mode channel (f2) in a radio system that comprises a first (f2) and a second (f1) direct mode channel, a repeater (R1) to which the first direct mode channel (f2) is allocated, and mobile stations (DMRU1 to DMRU6). In the method, the repeater (R1) tunes to and listens to the second direct mode channel (f1) and determines the moment when it can transmit on the second direct mode channel; the repeater (R1) transmits one or more pick-up messages on the second direct mode channel; the mobile stations (DMRU4, DMRU6, DMRU7) that communicate on the second direct mode channel (f1) receive the pick-up messages; and the desired mobile stations that communicate on the second direct mode channel (f1) switch, in response to the pick-up messages, to the first direct mode channel (f2) for communication.

16 Claims, 8 Drawing Sheets

PRIOR ART

PICKING UP OF MOBILE STATIONS FROM A DIRECT MODE CHANNEL

FIELD OF THE INVENTION

The invention relates to a method of picking up mobile stations onto a direct mode channel in a radio system that comprises a first and a second direct mode channel, a repeater to which the first direct mode channel is allocated, and mobile stations.

BACKGROUND OF THE INVENTION

The invention relates to mobile telephone systems. A subscriber of a mobile telephone system, i.e. a subscriber station, such as a radio phone or a mobile station, may be registered in a radio network or system, whereby it communicates with the radio network via system channels comprising control or traffic channels maintained by the base stations of the radio network.

Apart from system channels of mobile telephone systems, direct mode channels can also be used, i.e. direct mode operation is applied. Mobile stations using direct mode operation do not communicate directly with a radio network or its base stations. Direct mode channels are frequencies at which radio phones or other means of communication are able to communicate without the system either directly with one another or, via repeater stations, with base stations of the system or with other mobile stations.

Direct mode channels are typically used in cases where e.g. a plural number of hand-portable phones communicate with one another at such a distance from the base station that system channels cannot be used.

Direct mode channels are also useful in the addition of capacity when traffic increases rapidly (incident) in one part of the service area of the system, e.g. at one point of the radio network.

A direct mode channel is also called a direct or simplex channel, or a simplex connection. A direct mode channel is a channel that is typically not utilised by the system at all. It may be, for example, a channel with the same channel spacing as the channels of the system, e.g. 12.5 kHz or 25 kHz. Of the radio phones operating on the direct mode channel, the transmitting station has tuned its transmitter to the channel and transmits speech or data information. The other radio phones set to direct mode operation have tuned their receivers to the same channel, whereby they are able to receive the transmission directly.

On a direct mode channel, both analogue modulation and digital modulation can be used. A radio phone transmitting on the channel can also send signalling information, such as information about access rights and priorities or about a group operating on the channel, or data traffic. On a direct mode channel, messages can be encrypted, or speech can be transmitted in clear form.

Subscriber stations operating in direct mode communicate with other subscriber stations on a direct mode channel without being in direct contact with base stations of the radio network. Subscriber stations in the direct mode, however, can communicate with the radio network via repeater stations. A repeater station is a means in which two radio units are interconnected. A repeater station typically comprises two transceivers. A repeater station transmits the information messages transmitted on a direct mode channel to the desired network elements, e.g. base stations of the radio network, which forward the information messages to the exchanges of the radio network. The information messages transmitted by a repeater station may be e.g. speech, or data or signalling messages. When a repeater is used on a direct mode channel, e.g. semiduplex communication is employed.

It should be noted that in direct mode operation, repeaters/repeater stations can also relay traffic between two mobile stations located within the coverage area of the repeater concerned but not necessarily within the coverage area of each other, or function as a gateway between the mobile communication system, especially a base station of the system, and mobile stations communicating on a direct mode channel.

In prior art solutions, e.g. as described in the TETRA (Trans European Trunked Radio System) standard, communication on a direct mode channel is based on group or individual identifiers. Direct mode channel operation is disclosed e.g. in RES 6.6(93)096 Version 0.0.8, Jan. 1995, Technical Requirements Specification, Part 4: Direct Mode, ETSI 31 pages. A repeater station operating on a direct mode channel can also be allocated to a certain group identifier. In such a case, the repeater station relays only traffic marked with this group identifier. Optionally, a repeater station can also be allocated to a plural number of group identifiers.

An open direct mode function, i.e. a direct mode function available to all subscribers, is provided by assigning a single group identifier to all the mobile stations and repeater stations operating on a direct mode channel. In the present invention, however, group identifiers are used for differentiating between organizations/suborganizations/communication groups communicating on a single direct mode channel.

A repeater station is often used such that it is activated to a certain direct mode channel for a group identifier, i.e. for a certain communication group, for mobile stations of that group. If a direct mode channel is reserved for a group identifier that is other than the one with which the base station seeking for activation and the mobile stations having the same group identifier and attempting to operate on a direct mode channel are marked, then the repeater station knows to move to another direct mode channel. After finding a free direct mode channel, the repeater station is activated to this new direct mode channel as a repeater station, and it indicates its group identifier in the identifier transmission.

The problem with the prior art solutions is that the mobile stations activated to the original direct mode channel and listening to that channel do not notice that the repeater station finds a free direct mode channel where it starts to relay traffic between mobile stations, and so the mobile stations cannot follow the repeater station to the direct mode channel where the repeater starts to operate.

This calls for a method of moving the mobile stations remaining on the original direct mode channel to a new direct mode channel reserved for their own group identifier.

More generally, the problem of the prior art is how to pick up the desired mobile stations, e.g. those listening to a certain group identifier, onto a certain direct mode channel from another direct mode channel or other direct mode channels. The use of direct mode channels is very dynamic, so advance planning does not ascertain that the mobile stations are on the same direct mode channel.

In a mobile communication system, mobile stations are allocated to a channel by the system, which means that the system switches the mobile stations to a channel in accordance with their group or individual identifiers. This is not, however, possible in direct mode operation, since here the system has no control over the mobile stations.

In direct mode operation, it is possible for a mobile station to scan a plural number of direct mode channels, looking for a transmission provided with its own group identifier. The basic idea of scanning is that if a transmission provided with a group identifier of a certain group is transmitted on a direct mode channel, and if the mobile station is on that direct mode channel at that particular moment, then the mobile station moves to the direct mode channel concerned.

In prior art, the problem with scanning is that it is difficult to implement in a watertight manner when there are more than two direct mode channels. Namely, it is unlikely that an identifier transmission will be received during the scanning phase, since a mobile station scanning direct mode channels is most of the time switching from one direct mode channel to another or is on another direct mode channel. The time used by a mobile station for scanning or listening to a certain direct mode channel is thereby very short as compared with the length of the transmissions on the direct mode channel. Also, scanning requires that a mobile station should continuously change frequencies, and this consumes power, so it is not a method to be recommended for hand-portable phones. Further, scanning makes it possible for a mobile station to move to another direct mode channel for traffic marked with the same group identifier, but it does not make it possible to pick up all the mobile stations scanning the same group identifier onto one and the same direct mode channel.

DESCRIPTION OF THE INVENTION

The invention aims at solving the problems of the prior art solutions.

The object of the invention is to provide a method of picking up the desired mobile stations from a second direct mode channel to a desired first direct mode channel. The second direct mode channel may or may not be dedicated to pick-up usage.

In particular, the object is to provide a method of picking up the mobile stations belonging to a certain communication group onto one and the same direct mode channel.

This new kind of method of picking up mobile stations onto a direct mode channel is characterized by said repeater tuning to the second direct mode channel and listening to the second direct mode channel and determining the moment when it can transmit on the second direct mode channel; said repeater transmitting one or more pick-up messages on the second direct mode channel; the mobile stations that communicate on the second direct mode channel receiving the pick-up messages; and the desired mobile stations that communicate on the second direct mode channel switching, in response to said pick-up messages, to the first direct mode channel for communication.

The invention also relates to a repeater for relaying traffic between mobile stations communicating on a direct mode channel, said repeater comprising: a transceiver unit for relaying radio messages between mobile stations communicating on a direct mode channel, and a control unit for controlling the operation of said repeater.

The repeater of the invention is characterized by comprising means for transmitting pick-up messages to mobile stations communicating on a second direct mode channel so as to switch them, for communication, to the direct mode channel used by the repeater.

The invention also relates to a mobile station communicating on a direct mode channel, the mobile station comprising: a transceiver, and a controller for controlling the operation of the mobile station.

The mobile station of the invention is characterized by comprising transferring means, responsive to the pick-up messages transmitted by a repeater communicating on a direct mode channel, for switching a mobile station from one direct mode channel to another.

The invention is based on the idea that a repeater operating on a direct mode channel, i.e. a repeater which has started to use a direct mode channel or to which that direct mode channel has been allocated, picks up the desired mobile stations, e.g. mobile stations belonging to a communication group for which the repeater has been reserved, from one or more direct mode channels onto the direct mode channel concerned. It should be noted that the repeater station may be a repeater station of an open direct mode channel. The mobile stations communicating on the second direct mode channel are picked up to the desired first direct mode channel such that the repeater sends a pick-up message on that second direct mode channel, and in response to that message, the desired mobile stations switch to the desired first direct mode channel.

One advantage of the invention is that the method makes it possible for the repeater station to pick up the desired mobile stations from the second direct mode channel to the first direct mode channel, where said repeater also starts to communicate. The difference between the present invention and the earlier methods is that in the latter, the mobile stations scan other direct mode channels for traffic marked with their group identifier, whereas in the present invention, the repeater commands the desired mobile stations located on a 'wrong', i.e. the second, direct mode channel to move to the desired, i.e. the first, direct mode channel. Thus the advantage of the invention is that it eliminates the necessity of scanning when a repeater station is used, i.e. the mobile stations need not tune to, i.e. scan, several direct mode channels.

Another advantage of the invention is that it saves power in the mobile stations, since scanning of direct mode channels is not necessary. This is due to the fact that the mobile stations need not scan, or tune to, several direct mode channels, so they do not use their batteries 'unnecessarily' for change of channels.

A further advantage of the invention is that it allows picking up of mobile stations listening to a certain group identifier onto a direct mode channel without it being necessary for the mobile stations to tune to several direct mode channels. Scanning of direct mode channels need thus not be implemented. From this it follows that money is saved at the design stage and that the mobile stations function in a simpler and thereby in a more reliable manner. The mobile stations are thus more reliable than the mobile stations of the prior art.

Yet another advantage of the invention is that it facilitates operation in a situation where the repeater station and mobile stations belonging to the group are activated to direct mode operation. In accordance with the invention, it is thus not relevant what direct mode channel a mobile station is activated to, since the repeater station picks up the mobile stations 'automatically' onto the correct channel. Activation is thus easier to implement; it is not so complicated as in the prior art where it has to be observed that all the desired mobile stations are picked up onto a certain direct mode channel.

BRIEF DESCRIPTION OF FIGURES

In the following, the invention will be described in greater detail with reference to the attached drawings, in which.

DETAILED DESCRIPTION OF THE INVENTION

Figure 1:
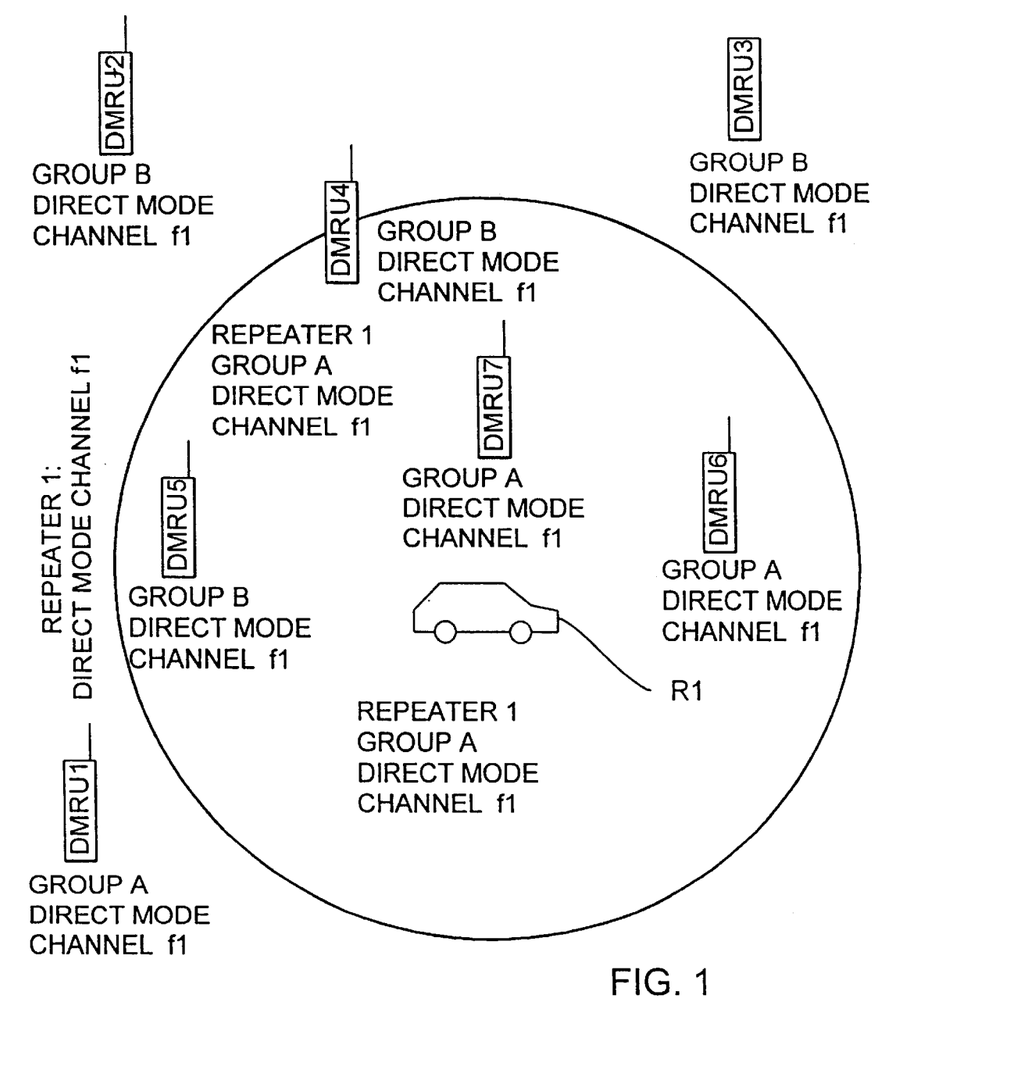
FIG. 1 is a scheme illustrating repeaters and mobile stations operating on a direct mode channel.

FIG. 1 shows a starting situation where repeater 1 (R1) operates on a second direct mode channel f1 as an active repeater station for communication group A indicated by group identifier A. Group identifier A is listened to by mobile stations DMRU1, DMRU6 and DMRU7. Of these mobile stations, DMRU1 is not within the coverage area of repeater 1, and so it cannot receive a transmission from the repeater (in this and the following figs., the range of repeater 1 is indicated by 'Repeater 1: direct mode channel f1', and the range of repeater 2 is indicated in a corresponding manner). Further, on the second direct mode channel f1 there are mobile stations DMRU2, DMRU3, DMRU4 and DMRU5, which wait for a channel to become free for communication group B indicated by group identifier B. In the frame structure of the direct mode channel, mobile station DMRU4 listens to a time slot reserved for a pick-up signal, as well as to repeater 1 identifier transmission. The time slot is determined beforehand in the frame structure, and it is known by both the repeater stations and the mobile stations. DMRU2 and DMRU3 are not within the coverage area of repeater 1, so from their point of view the direct mode channel is free, and they act accordingly.

Figure 2:
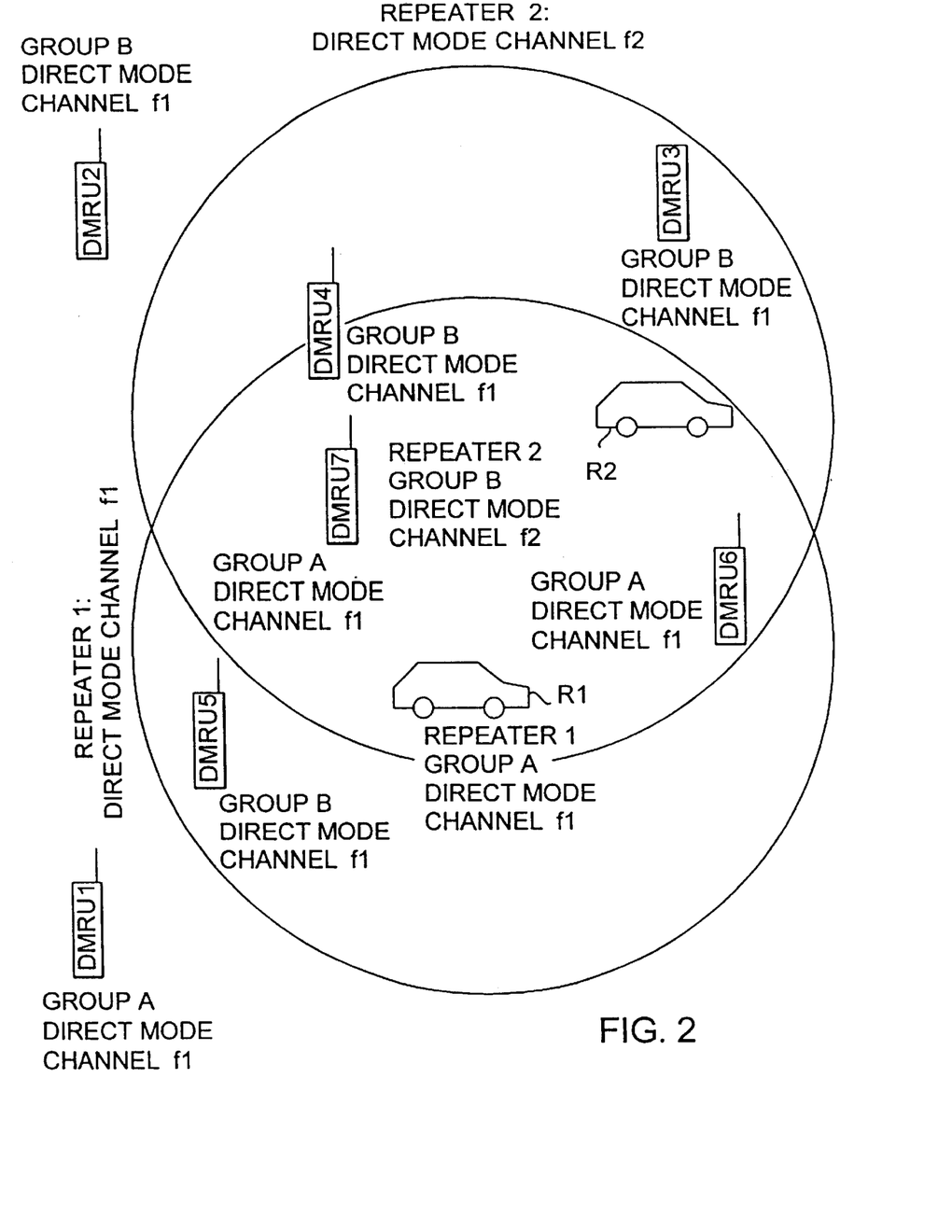
FIG. 2 is a scheme illustrating a situation where a second repeater is activated onto a second direct mode channel.

FIG. 2 shows how repeater 2 (R2) is activated to direct mode channel f2. In FIG. 2, repeater 2 (R2) reserves a free direct mode channel f2 by starting to send an identifier transmission. The identifier transmission indicates a group identifier B. Between the identifier transmissions, repeater 2 (R2) moves to the second direct mode channel f1 for transmitting a pick-up signal. If repeater 2 (R2) is relaying on the second direct mode channel f2 for group identifier B, it may be difficult to allocate a free pick-up time slot. Because of this, repeater 2 (R2) can always wait e.g. until the call is terminated before starting the pick-up procedure.

Figure 3:
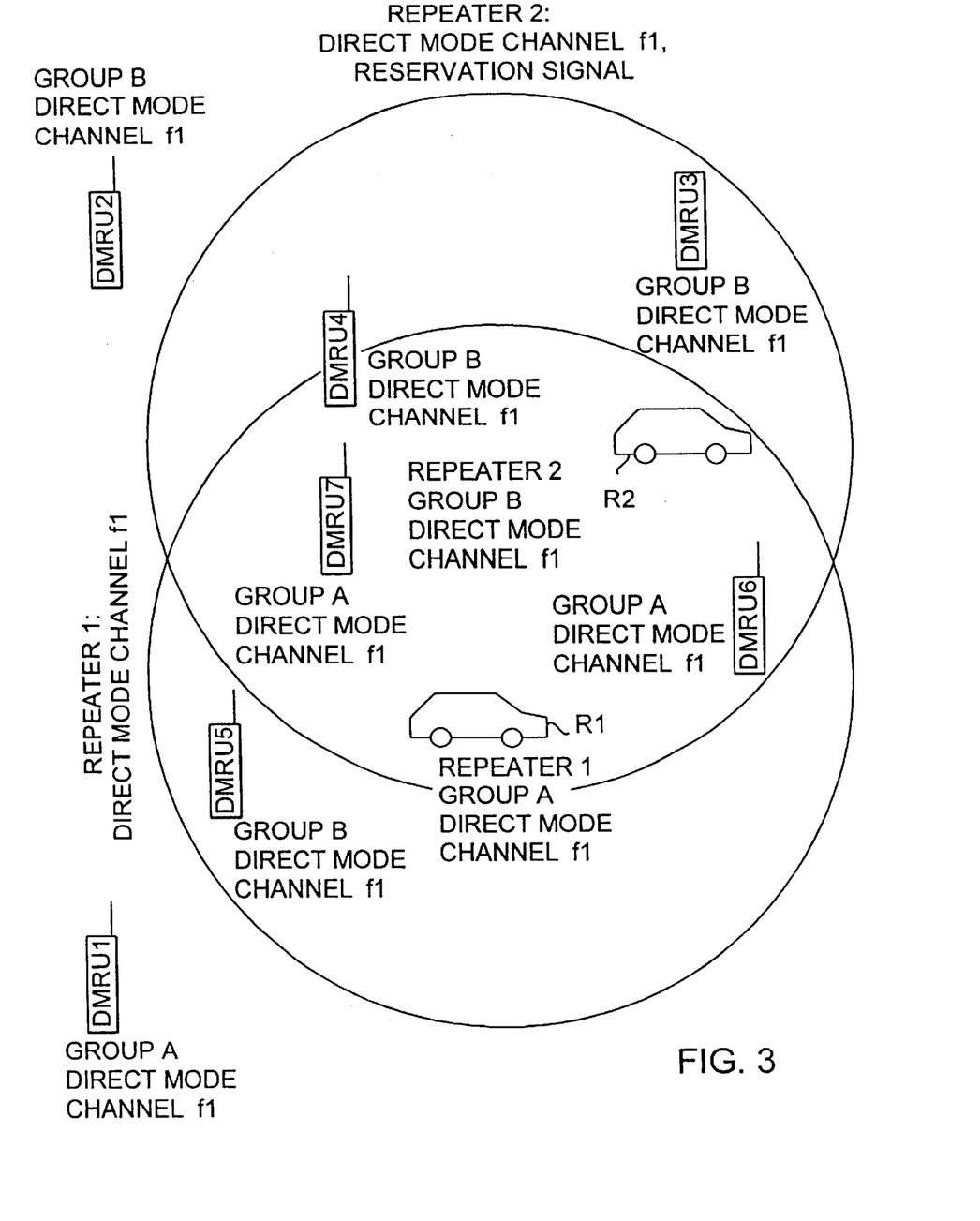
FIG. 3 is a scheme illustrating a situation where a second repeater sends a pick-up message on the second direct mode channel to the mobile stations of a certain communication group.

In FIG. 3, repeater 2 (R2) sends a pick-up signal on the second direct mode channel f1 to group identifier B, and repeater 2 (R2) scans traffic on the second direct mode channel f1. When repeater 2 learns the frame structure used on the direct mode channel, it waits for the time slot reserved for a pick-up signal in the frame structure. In this time slot, repeater 2 sends a pick-up signal which indicates a possible group identifier B and an identifier of the direct mode channel f2 to which the desired mobile stations are to move. The use of group identifiers, however, is optional.

DMRU4 listening to a pick-up signal time slot receives a pick-up signal, and since it is addressed to group identifier B, which is the identifier of the group to which the mobile station concerned belongs, DMRU4 switches to direct mode channel f2.

Mobile station DMRU3 detects the pick-up signal during normal scanning of the second direct mode channel f1, and moves to direct mode channel f2. Mobile station DMRU3 does not know the frame structure used under repeater 1. Because of this, the pick-up signal has to be repeated sufficiently often in succession, so that even the mobile stations that do not know the frame structure can be picked up.

Mobile stations DMRU2 and DMRU5 cannot receive the pick-up signal, since they are not within the range of repeater 2. For the same reason, DMRU1 (group identifier A) does not receive the pick-up signal, either.

Repeater 2 (R2) returns to the first, i.e. the original, direct mode channel f2 so as to send an identifier transmission/relay transmissions of mobile stations, and waits for the mobile stations to move from the second direct mode channel to the first direct mode channel.

FIG. 3 illustrates a situation where an active repeater station and/or mobile station operates on the second direct mode channel. Upon finding a free direct mode channel, it is here possible to send a pick-up message for a longer period of time (see FIG. 5), since the traffic originally found on the second direct mode channel is not interfered with, because no such traffic exists.

Figure 4:
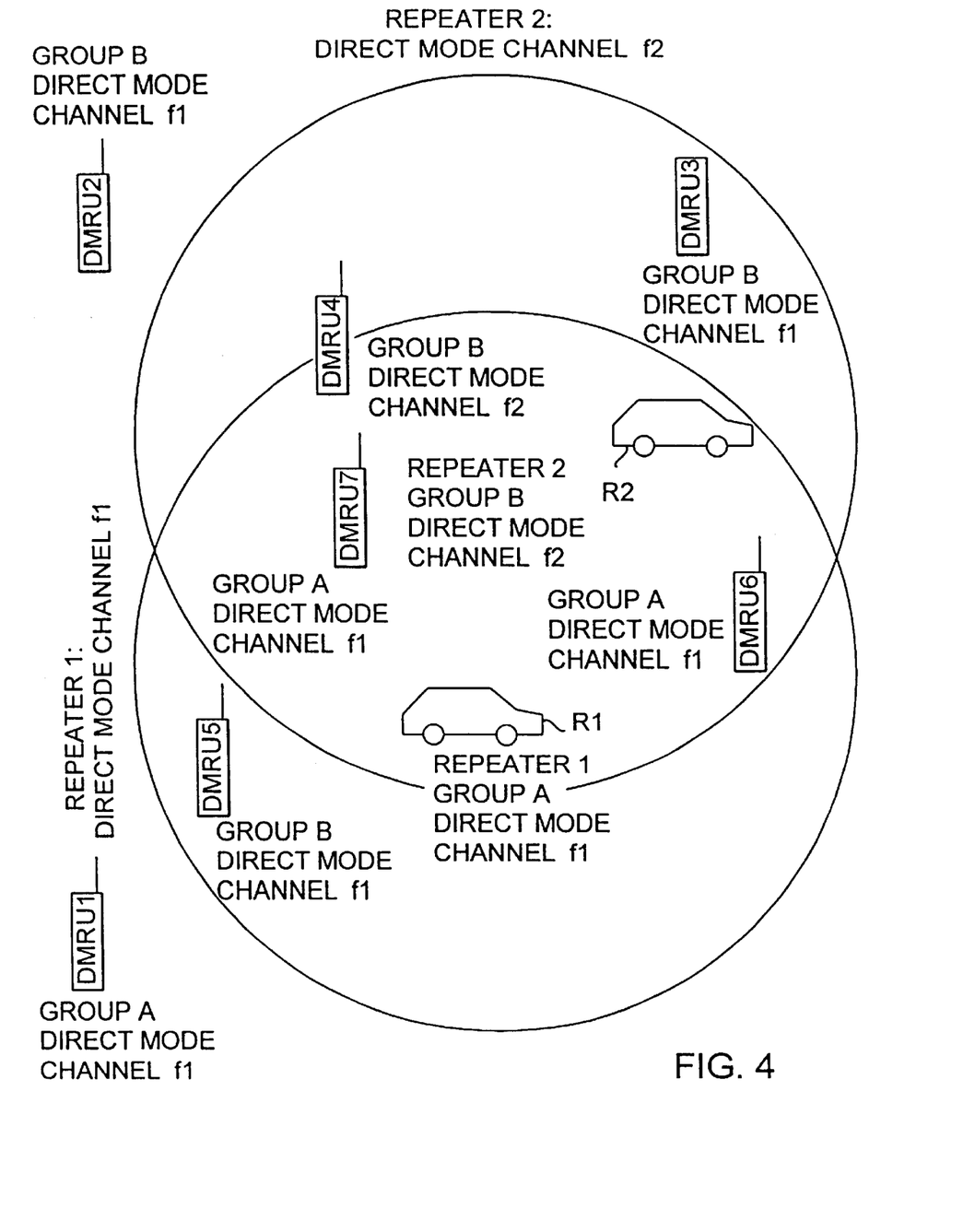
FIG. 4 is a scheme illustrating the result of the pick-up procedure: mobile stations of a certain communication group have been picked up from the second direct mode channel onto a first direct mode channel.

FIG. 4 shows the final situation. Repeater 1 still operates on the second direct mode channel f1 as a repeater for group identifier A, and mobile stations DMRU6 and DMRU7 are still listening/transmitting to it. In the above, no action has been required from these entities (repeater 1, DMRU6 and DMRU7). They have not even detected the pick-up procedure.

After a successful pick-up, repeater 2 (R2) operates on the first direct mode channel f2 as an active repeater for group identifier B, and DMRU3 and DMRU4 are listening/transmitting to it.

Mobile stations DMRU2 and DMRU5 are still on direct mode channel f1, since they have not received a pick-up signal because they have been beyond the coverage area of repeater R2.

Mobile station DMRU1 is still on direct mode channel f1.

The following is a description of problems involved in sending a pick-up signal and of solutions to the problems, primarily as concerns timing of the pick-up message.

In all the solutions discussed below, it is assumed that the repeater station intending to send a pick-up signal is able to detect whether or not there is traffic on the direct mode channel on which it intends to send the pick-up signal. Traffic here means that there is a mobile station on the channel sending transmissions and optionally a repeater station relaying the transmission.

If the direct mode channel on which the pick-up signal is to be transmitted is free, i.e. there are no mobile stations on the channel transmitting to a direct mode channel, transmission of a pick-up signal is simple: the pick-up signal is repeated sufficiently often in succession. It is possible, but not likely, that call set-up signals and allocation signals coincide on the direct mode channel. The mobile stations that wait for establishment of a call with their own group identifier B receive a pick-up signal with the group identifier concerned and move to the direct mode channel indicated by it.

If the direct mode channel on which the pick-up signal is to be transmitted is currently used for traffic, the repeater station R2 performing the pick-up must determine the frame synchronization used. For the transmission of the pick-up signal, a certain time slot or several time slots are reserved. The time slot concerned is listened to by the mobile stations that do not listen to the group identifier of the on-going traffic. One possible solution is presented in the TETRA specification RES 06-WG2 (RES 6.2(94)171), Jan. 30, 1995, TETRA Direct Mode Working Assumptions rev. 5, ETSI, 8 pages. The document teaches that a certain time slot is assigned for interruption of a mobile station transmitting on a direct mode channel, whereby only certain frames of an 18-frame multiframe are used for interruption, e.g. frames 3, 6, 9, 12, 15 and 18, and so one/some of the interruption time slots in the free frames 1, 2, 4, 5, 7, 8, 10, 11, 13, 14, 16 and/or 17 can be reserved for the pick-up signal.

The problem with transmission of a pick-up signal is that the repeater station R2 cannot be on the direct mode channel that it has reserved when it is transmitting a pick-up signal on the second direct mode channel. If at this time a call set-up procedure is started on the direct mode channel reserved, then the repeater station loses this (these) signal(s) and will not start to relay the transmission concerned. To prevent this, the repeater station can indicate in the identifier transmission that it is not available during a certain time slot. Transmission of a pick-up signal can be implemented such that when the repeater leaves for the second direct mode channel, it commands the mobile stations to switch to a power-saving state. The repeater station then puts the mobile stations to sleep e.g. for the duration of the sending of the identifier transmissions, while it itself visits the second direct mode channel, sending a pick-up signal thereon.

Figure 5:
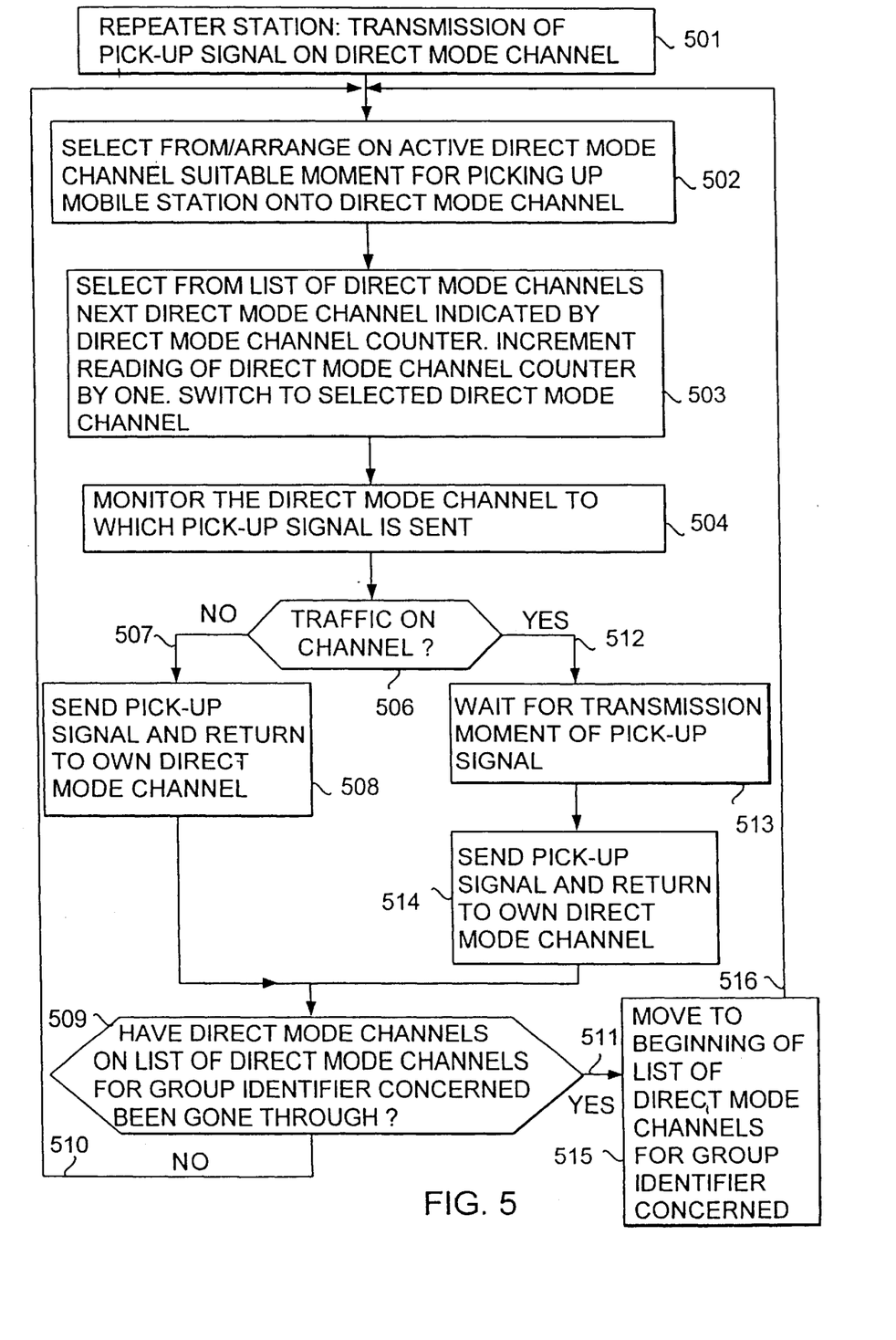
FIG. 5 is a block diagram illustrating the pick-up of mobile stations belonging to a certain communication group onto a desired direct mode channel on the basis of the group identifier.

FIG. 5 is a block diagram that illustrates picking up of mobile stations belonging to a certain communication group onto a desired direct mode channel on the basis of the group identifier. In this embodiment, the repeater station decides 501 to send a pick-up signal on a certain direct mode channel so as to pick the desired mobile stations onto a direct mode channel that said repeater will start to maintain. Subsequently, the repeater selects from or arranges on an active direct mode channel, i.e. a channel on which the mobile stations to be picked up communicate, a period of time during which the repeater can pick the desired mobile stations from said direct mode channel onto the desired first direct mode channel. In step 503, the next direct mode channel indicated by a direct mode channel counter is selected from the list of direct mode channels. The reading of the direct mode channel counter is then increased by one, and the selected direct mode channel is switched to. After this, the repeater scans 504 the direct mode channel to which the pick-up signal is sent, and a decision 506 is made on the basis of the occurrence of traffic. If no traffic is detected 507 on the channel, the repeater sends 508 a pick-up signal and returns to its own, original direct mode channel. In response to the pick-up signal, the desired mobile stations, after receiving the pick-up signal, move to the direct mode channel indicated by the repeater. The repeater station can send pick-up messages on all the direct mode channels that are marked in the list of direct mode channels for the group identifier concerned, i.e. on the direct mode channels where it assumes to find mobile stations that are able to participate in the group communication concerned. A check 509 is conducted to find out whether all the direct mode channels on the list of direct mode channels for the group identifier concerned have been gone through. If not 510, one returns to step 502. If, on the other hand, all desired direct mode channels have been gone through 511, one moves to the beginning 515 of the list of direct mode channels for the group identifier concerned, i.e. starts to send pick-up messages to those direct mode channels that such messages have already been sent to, whereby one returns to step 502. If necessary, it is possible to stay in step 502 even for a long period of time.

If, on the other hand, traffic 512 is detected 506 on the direct mode channel concerned, the repeater will wait 513 for a suitable moment to send a pick-up signal. Such a moment arrives, for example, when not a single entity is transmitting on the direct mode channel concerned. The repeater then sends 514 the pick-up signal and returns after the transmission to its own, original direct mode channel. After this, one continues from step 509, which has been described above.

Figure 6:
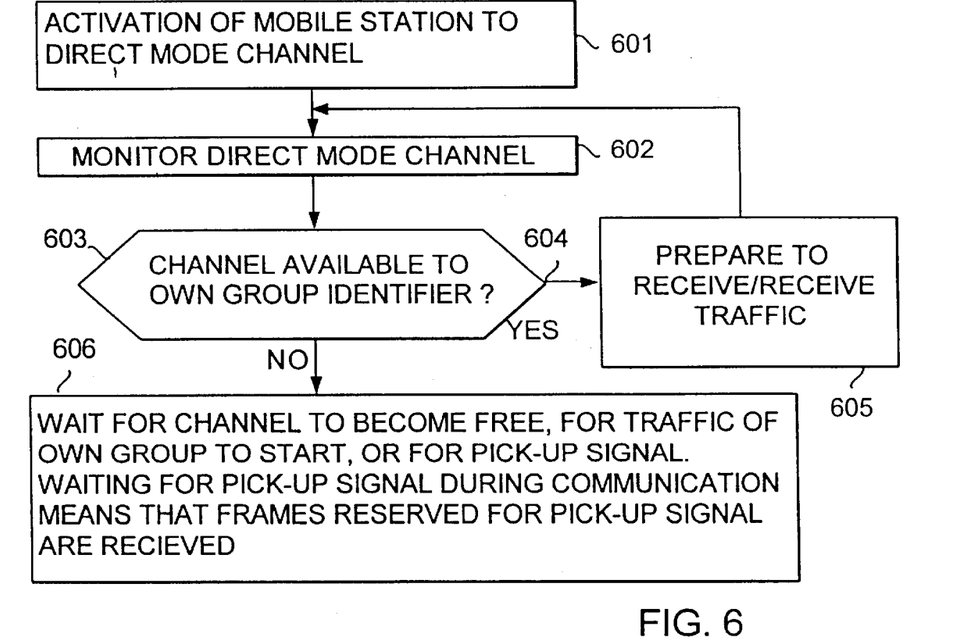
FIG. 6 is a block diagram illustrating the pick-up of mobile stations and their activation to a direct mode channel.

FIG. 6 is a block diagram illustrating picking up and activation of mobile stations to a direct mode channel. FIG. 6 illustrates the operation of a mobile station on a direct mode channel. At first, a mobile station is activated to a certain direct mode channel 601. The mobile station then starts to scan 602 said direct mode channel at desired intervals. The mobile station checks 603 whether said channel is allocated to a group communication marked with the group identifier of the group of the mobile station concerned. The group communication can be a group call or a pseudo open channel. If the channel is not used by the communication group concerned, the mobile station either waits for said direct mode channel to become free or for traffic of its own communication group to start, or waits for a pick-up signal 606 transmitted to said mobile station. Waiting for a pick-up signal during communication means that the frames reserved for the pick-up signal are received.

Figure 7:
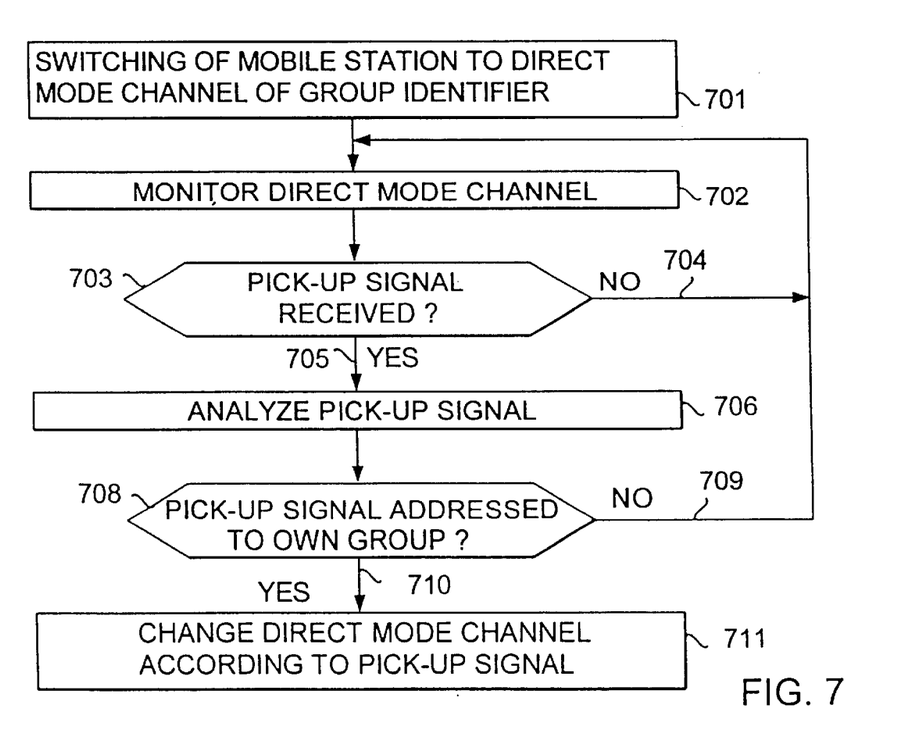
FIG. 7 is a block diagram illustrating the operation of a mobile station as it moves to a desired direct mode channel in response to a pick-up command.

FIG. 7 is a block diagram illustrating the operation of a mobile station as it moves to the desired direct mode channel 701 in response to a pick-up command. On a direct mode channel, the mobile station scans 702 the channel and checks 703 whether it has received a pick-up signal. If no pick-up signal has been received within a suitable interval, one returns to step 702, i.e. the mobile station starts to scan the direct mode channel again. If, on the other hand, the mobile station has received 705 a pick-up signal, it checks whether said pick-up signal is intended for its own communication group 708. If the pick-up signal is not intended for the group of said mobile station, one returns to step 702, i.e. the mobile station continues to scan the direct mode channel concerned. If, on the other hand, the pick-up signal is intended for the group of said mobile station, the mobile station leaves the direct mode channel for the desired direct mode channel in accordance with the pick-up signal.

Figure 8:
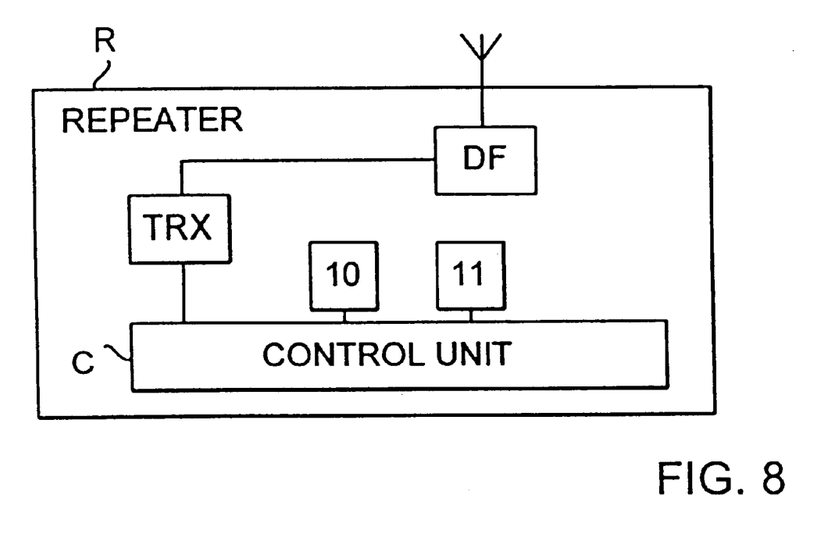
FIG. 8 is a block diagram illustrating a repeater according to the invention.

FIG. 8 is a block diagram of a repeater station according to the invention. A repeater station according to the invention is used locally both for expanding the range of the radio system beyond the coverage area of the base stations and for amplifying the transmission from radio phones operating on direct mode channels so as to implement communication between them.

A repeater station according to the invention may communicate with an entire mobile communication system, which may comprise at least one base station having control and traffic channels with uplink and downlink frequencies. The exchanges of the mobile communication system may connect the various base stations and the entire mobile communication system to other telecommunication networks. The mobile communication system also comprises mobile stations communicating on a direct mode channel. Further, it comprises a repeater station for relaying traffic between mobile stations communicating on a direct mode channel and between said mobile stations and said base station.

FIG. 8 shows the basic structure of a repeater, or repeater station, according to the invention. The repeater R comprises a transceiver unit TRX, a duplex filter DF and a control unit C. The control unit C controls the operation of the transceiver and routes the audio signals received and the audio signals to be transmitted. Mobile stations belonging e.g. to the same communication group are connected to the repeater over a radio path.

The repeater according to the invention is characterized by means 10 for transmitting pick-up messages to mobile stations communicating on another direct mode channel so as to switch them, for communication, to the direct mode channel used by the repeater.

The repeater further comprises timing means 11 for determining the moment when the repeater can send pick-up messages on the direct mode channel.

The timing means 11 for determining the moment when the repeater can send pick-up messages on the direct mode channel are arranged to receive and analyze the frame structure of the direct mode channel and to select as the transmission moment of the repeater station such a time slot from the frame structure of the direct mode channel during which there is no other traffic on the channel.

Figure 9:
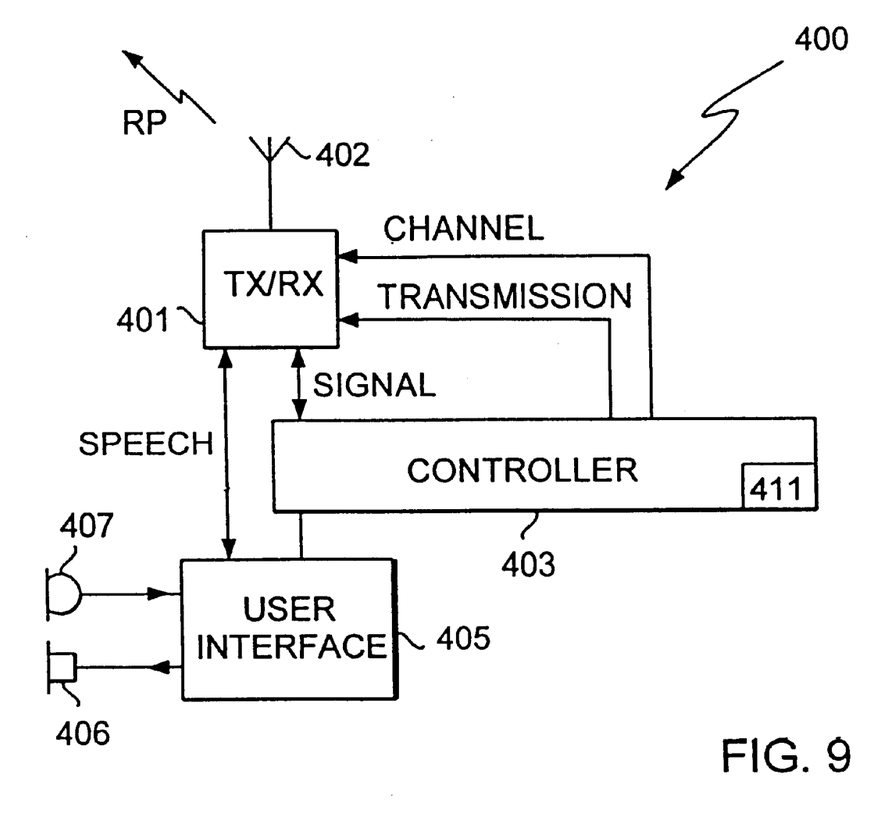
FIG. 9 is a block diagram illustrating a mobile station according to the invention.

FIG. 9 is a block diagram of a mobile station according to the invention communicating on a direct mode channel. FIG. 9 shows a typical radio unit 400 communicating on a direct mode channel, i.e. a radio phone, mobile station or e.g. a subscriber station used by the subscriber. The function of a transceiver (TX/RX) 401 is to tune to the channel used. To the transceiver 401 is connected an antenna 402, which is connected to the radio path RP. Usually, radio frequencies in the range of 60 to 1000 MHz (VHF and UHF ranges) are used, but other frequencies are also possible. On the radio path RP, analogue modulation can be used, the modulation then usually being phase modulation. Other kinds of modulation can also be used. Signalling can be transmitted e.g. by a voice-frequency subcarrier wave (FFSK). Transmission over a radio path can also be digital. The radio unit may tune to and communicate at the uplink and downlink frequencies of the direct mode channel.

A user interface 405 comprises electroacoustic transducers, typically a headphone 406 and a microphone 407, and optionally buttons for starting and ending a call, and for dialling. Since in a trunking system, and especially on a direct mode channel, transmission over a radio path RP is advantageously unidirectional, the subscriber station usually also has a push-to-talk button that must be depressed for the duration of the speech item. The push-to-talk button is not shown in FIG. 9.

The function of a controller 403 is to control the operation of the radio unit. The controller 403 is connected to the user interface 405, from which it receives impulses e.g. for starting and ending a call. The controller 403 may also give the user, via the user interface 405, acoustic or visual signals that relate to the operation of the mobile phone and/or the mobile telephone system.

The controller 403 is connected to the transceiver TX/RX 401. The channel used by the transceiver is allocated by the controller 403, i.e. the transceiver 401 tunes to the channel, i.e. radio frequency and a suitable time slot, allocated by the controller 403. The radio unit of the invention is able to tune to the direct mode channel, and to its uplink and downlink channels and frequencies. The transceiver 401 is also activated by the controller 403. The controller 403 receives and transmits signalling messages through the transceiver 401. A radio unit, or mobile station 400, of the invention communicating on a direct mode channel can be used e.g. in a radio system that comprises a radio network having at least one base station and mobile stations and optionally one or more repeater stations that relay traffic between the at least one base station and the subscriber stations communicating on the direct mode channel. The mobile station communicating on the direct mode channel comprises a transceiver 401, and a controller 403 for controlling the operation of the mobile station.

The inventive mobile station 400 comprises transferring means 411, responsive to the pick-up messages of the repeater station communicating on a direct mode channel, for switching the mobile station from the first direct mode channel to the second direct mode channel.

Figure 10:
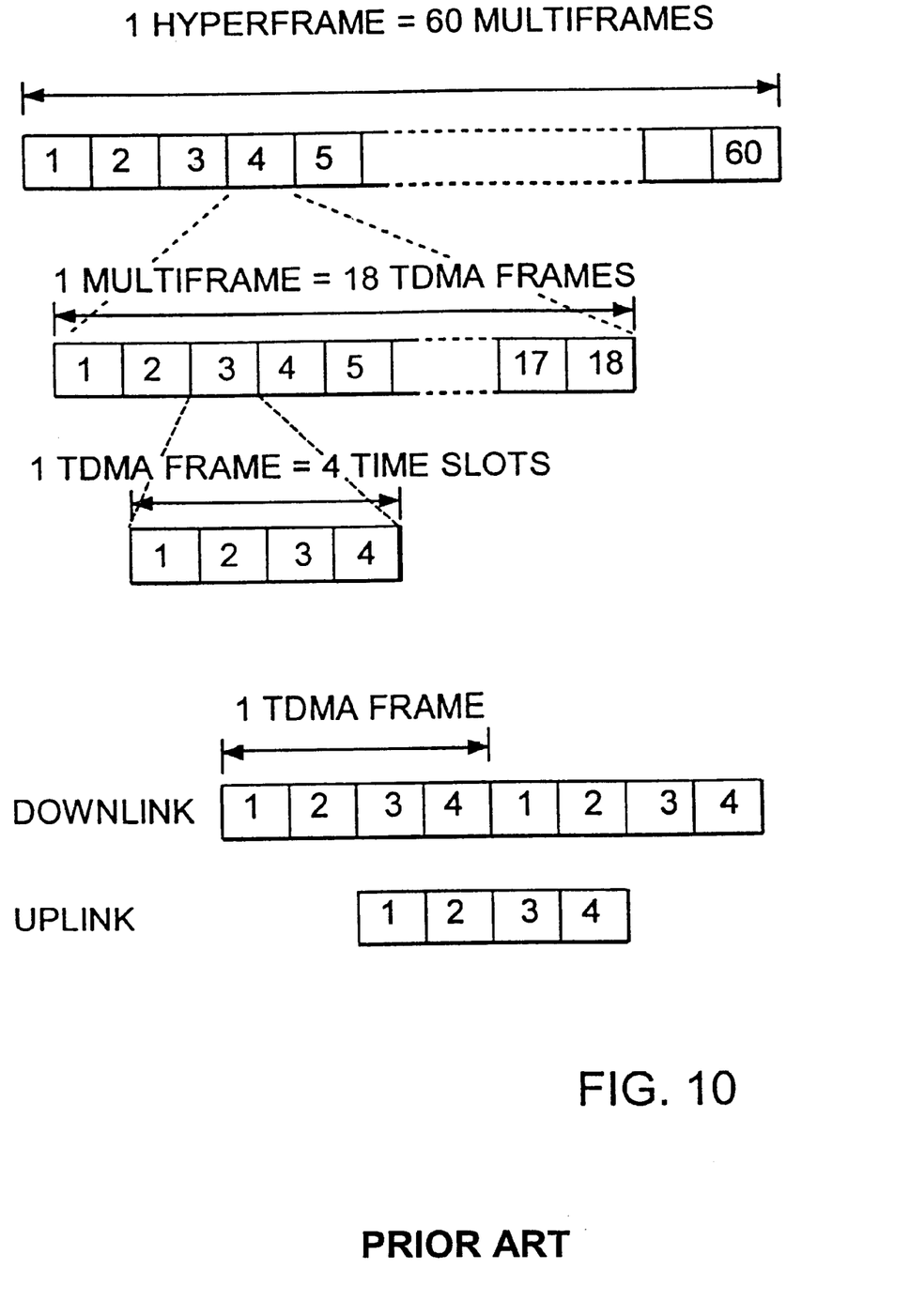
FIG. 10 shows the frame structure of a TETRA mobile communication system.

FIG. 10 shows the frame structure of a TETRA mobile communication system. On the system channels, the uplink frequency, i.e. the direction from the mobile station to the base station (RU→BS), is delayed in the TETRA protocol by two time slots from the downlink frequency, i.e. the direction from the base station to the mobile station (BS→RU). A direct mode channel is divided physically into frames and time slots in the same way, except that a single frequency is used for communicating to both directions.

In the frame structure of a TETRA radio system, one hyperframe contains 60 multiframes, each of which contains 18 TDMA frames. The 18th frame of the multiframe is a control frame. Each TDMA frame is divided into four time slots 1 to 4. There are no hyperframes on direct mode channels.

In the method of the invention, the pick-up message 508 is transmitted in the desired frames of the multiframe on the direct mode channel. The pick-up message can be transmitted in the desired time slot of the desired frame of the multiframe on the direct mode channel.

An additional feature of the invention is that repeater R1 adds information indicating the time slots during which the repeater does not communicate on the direct mode channel to its own identifier transmission sent on the direct mode channel. The mobile stations communicating on the direct mode channel maintained by the repeater thus know the periods of time when the repeater is on the second direct mode channel and therefore unable to send anything to the mobile stations concerned. If the mobile stations so desire, they can switch off their reception when the repeater is on the second direct mode channel. This helps to save power in the mobile stations.

The drawings and the description associated with them are only intended to illustrate the idea of the invention. The method, repeater and mobile station according to the invention may vary in their details within the scope of the claims. Although the invention is described above mainly in connection with trunked radio systems, it can also be used in other kinds of telecommunication and mobile communication systems.

We claim:

1. A method of picking up mobile stations onto a direct mode channel in a radio system that comprises a first and a second direct mode channel, a repeater to which the first direct mode channel is allocated, and mobile stations, said method comprising the steps of said repeater tuning to the second direct mode channel and listening to the second direct mode channel and determining the moment when it can transmit on the second direct mode channel;

said repeater transmitting one or more pick-up messages on the second direct mode channel;

the mobile stations that communicate on the second direct mode channel receiving the pick-up messages; and the desired mobile stations that communicate on the second direct mode channel switching, in response to said pick-up messages, to the first direct mode channel for communication.

2. A method according to claim 1, wherein said pick-up message containing the identifier of the first direct mode channel.

3. A method according to claim 2, the method comprising the steps of the first direct mode channel being allocated to a certain communication group, said pick-up message containing the identifier of said communication group, and in response to said identifier and said message the mobile stations of said communication group that communicate on the second direct mode channel switching to the first direct mode channel for communication.

4. A method according to claim 2, wherein said repeater adding information indicating the time slots during which the repeater does not communicate on the direct mode channel to its own identifier transmission sent on the direct mode channel.

5. A method according to claim 1, the method comprising the steps of the first direct mode channel being allocated to a certain communication group, said pick-up message containing the identifier of said communication group, and in response to said identifier and said message the mobile stations of said communication group that communicate on the second direct mode channel switching to the first direct mode channel for communication.

6. A method according to claim 5, wherein said repeater adding information indicating the time slots during which the repeater does not communicate on the direct mode channel to its own identifier transmission sent on the direct mode channel.

7. A method according to claim 1, wherein the repeater determining the moment when the repeater can transmit on the second direct mode channel such that the repeater receives and analyzes the frame structure of the second direct mode channel and selects as its own transmission moment such a time slot from the frame structure of the direct mode channel during which there is no other traffic on the direct mode channel.

8. A method according to claim 7, wherein said repeater adding information indicating the time slots during which the repeater does not communicate on the direct mode channel to its own identifier transmission sent on the direct mode channel.

9. A method according to claim 1, wherein said pick-up message is transmitted repeatedly.

10. A method according to claim 1, wherein said pick-up message is transmitted in the desired frames of the multiframe on the direct mode channel.

11. A method according to claim 10, wherein said pick-up message is transmitted in the desired time slot of the desired frame of the multiframe on the direct mode channel.

12. A method according to claim 1, wherein said repeater adding information indicating the time slots during which the repeater does not communicate on the direct mode channel to its own identifier transmission sent on the direct mode channel.

13. A direct mode repeater for relaying traffic between mobile stations communicating on a direct mode channel, said repeater comprising:

a transceiver unit for relaying radio messages between mobile stations communicating on the direct mode channel, and a control unit for controlling the operation of said direct mode repeater, transmitting means for transmitting pick-up messages to mobile stations communicating on a second direct mode channel so as to switch them, for communication, to the direct mode channel used by the repeater.

14. A direct mode repeater according to claim 13, wherein said repeater comprises timing means for determining the moment when the repeater can send pick-up messages on the second direct mode channel.

15. A direct mode repeater according to claim 14, wherein said timing means for determining the moment when the repeater can send pick-up messages on the second direct mode channel are arranged to receive and analyze the frame structure of the second direct mode channel and to select as the transmission moment of the direct mode repeater station such a time slot from the frame structure of the second direct mode channel during which there is no other traffic on the channel.

16. A mobile station communicating on a direct mode channel comprising:

a transceiver, a controller for controlling the operation of the mobile station, transferring means, responsive to pick-up messages sent by a repeater communicating on a first direct mode channel, for switching said mobile station from a first direct mode channel to a second direct mode channel.

* * * * *